Aug. 5, 1941.    J. FITZPATRICK ET AL    2,251,825
FOOT MEASURING DEVICE
Filed July 14, 1938    3 Sheets-Sheet 1
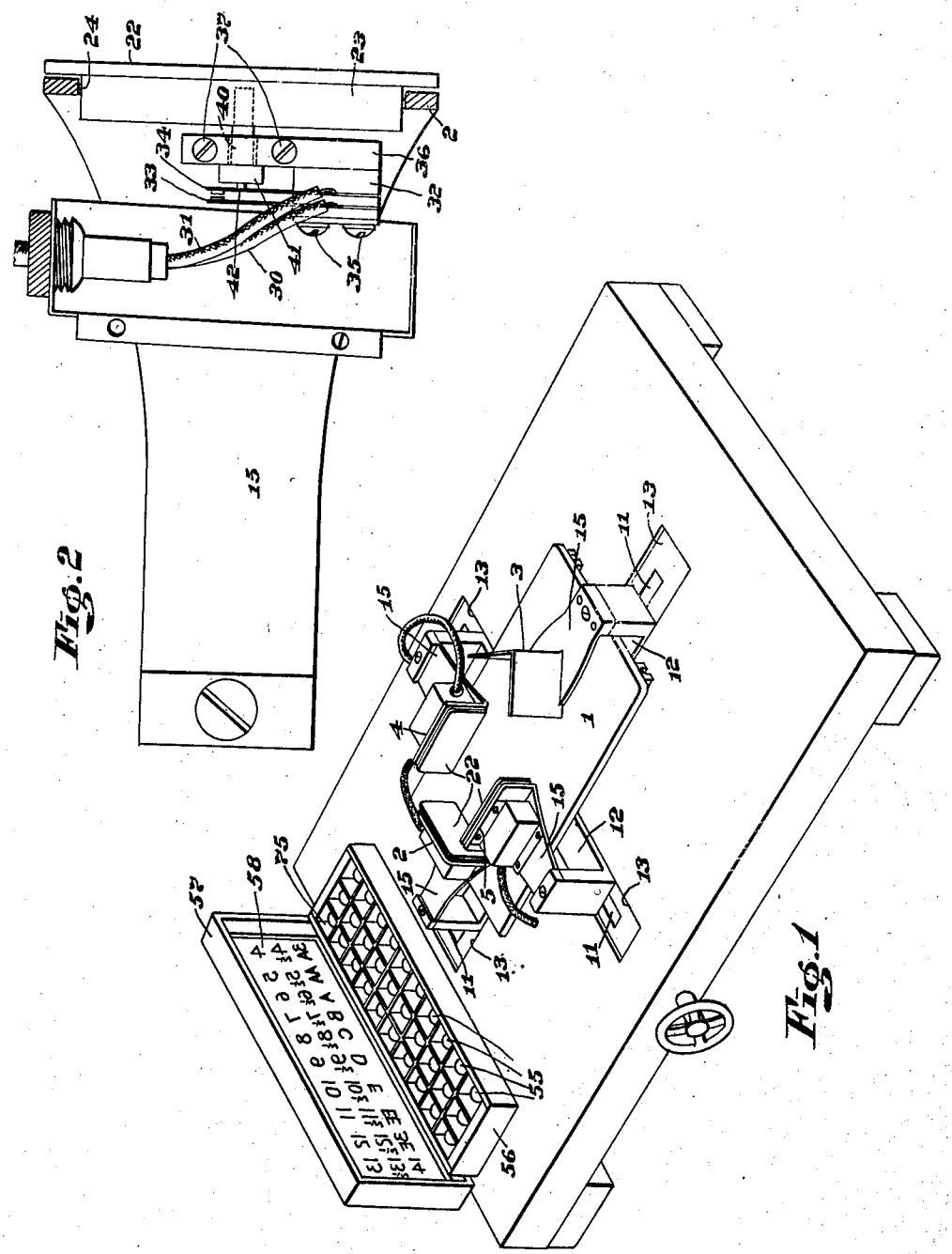
INVENTORS
Jeremiah Fitzpatrick
Donald B. Ames
BY
John E. R. Hayes
ATTORNEY Aug. 5, 1941.  J. FITZPATRICK ET AL  2,251,825
FOOT MEASURING DEVICE
Filed July 14, 1938  3 Sheets-Sheet 2

INVENTORS
Jeremiah Fitzpatrick
Donald B. Ames
BY
ATTORNEY

Aug. 5, 1941.                J. FITZPATRICK ET AL                 2,251,825
                              FOOT MEASURING DEVICE
                              Filed July 14, 1938              3 Sheets-Sheet 3
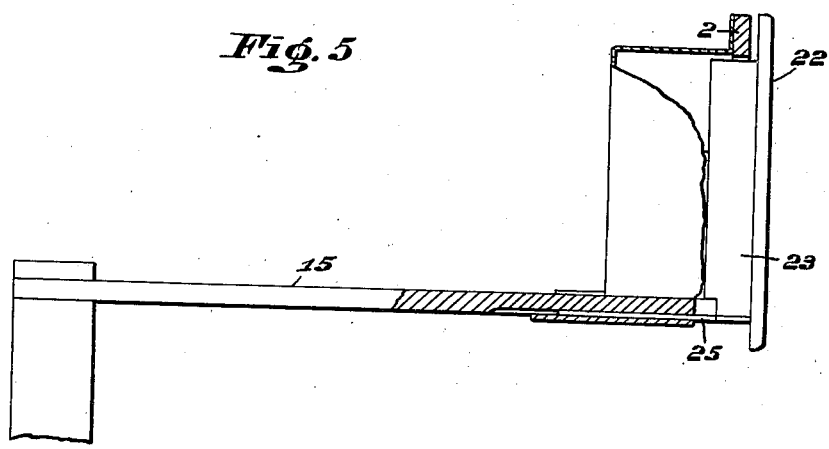
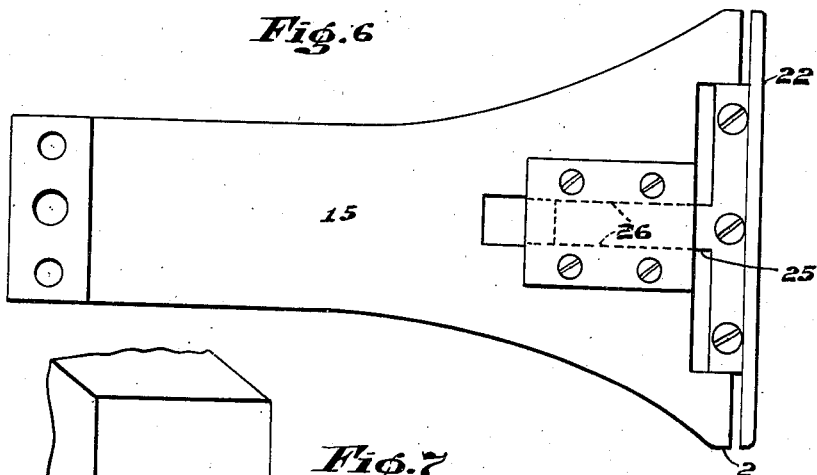
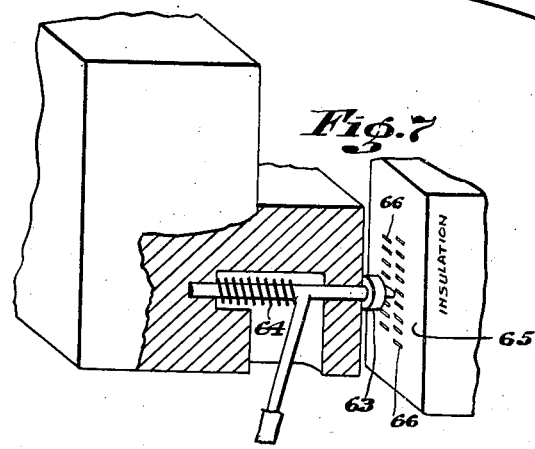
INVENTORS
Jeremiah Fitzpatrick
BY Donald B. Ames
ATTORNEY Patented Aug. 5, 1941

2,251,825

UNITED STATES PATENT OFFICE 2,251,825

FOOT MEASURING DEVICE

Jeremiah Fitzpatrick, Weymouth, and Donald B. Ames, Bridgewater, Mass.; said Ames assignor to said Fitzpatrick Application July 14, 1938, Serial No. 219,176

4 Claims. (Cl. 177—311)

The essential object of the invention is to equip a foot measuring device with a sign that will give visual indication, through illumination of indicia, of the proper size of shoe called for by a foot measured by the device.

A further object of the invention is to provide means whereby it may be determined through visual indication when the bearing pressure of the gauge against the foot is proper for obtaining accurate measurement.

The invention is shown and described for purpose of example as applied to a measuring device like that shown in United States Patent No. 1,872,921 of August 23, 1932, granted co-applicant Jeremiah Fitzpatrick, and also as shown in the pending application for Letters Patent of the United States by said Jeremiah Fitzpatrick, filed June 21, 1937, Serial No. 149,413 to which devices the improvements herein shown and claimed are especially applicable.

The invention can best be seen and understood by reference to the drawings in which—

Fig. 1 is a top view in perspective of the device.

Fig. 2 is a plan of a portion of the device shown in Fig. 1.

Fig. 5 is a view partly in side elevation and partly in vertical cross section of the part shown in Fig. 2.

Fig. 6 is a plan of the part shown in Fig. 5 looking from the under side thereof; and Fig. 7 is a view partly in section but mainly in perspective of another detail of construction, to which reference will later be made.

Figure 3:
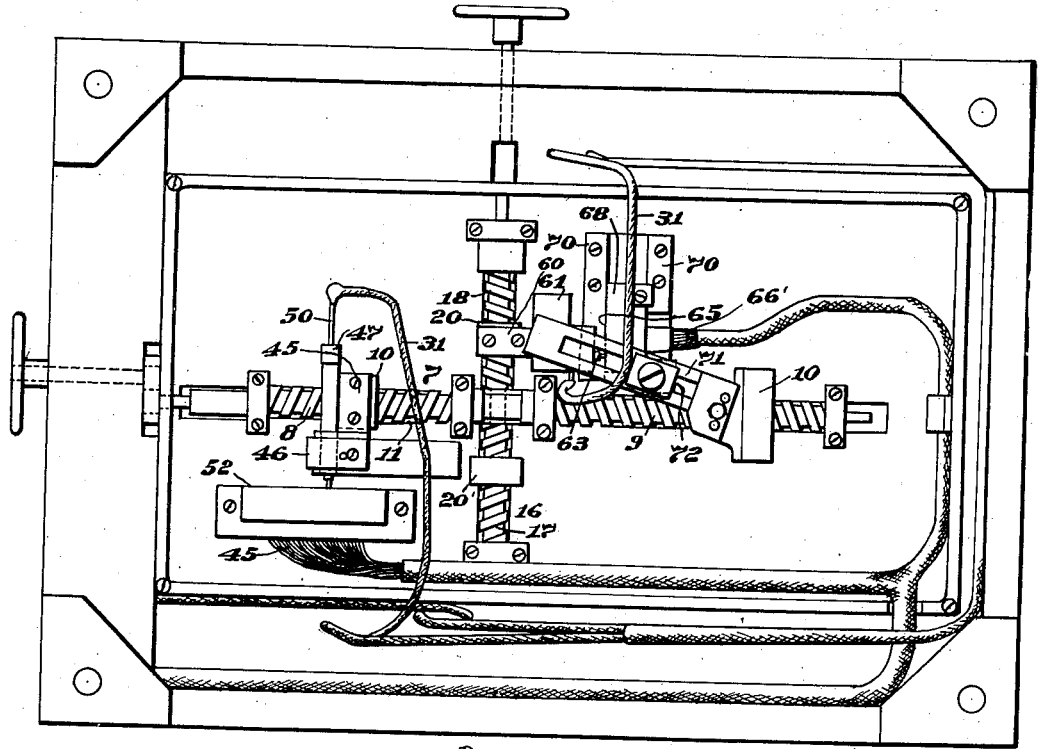
Fig. 3 is a plan of the device looking from the under side thereof.
Figure 4:
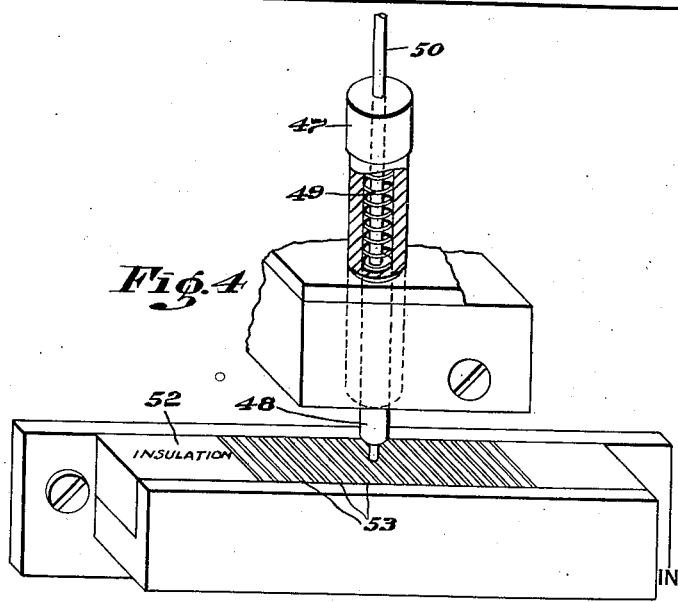
Fig. 4 is a view in perspective of a detail of construction.

Referring to the drawings:

Arranged to be movable over the bed 1 of the machine are gauge forming toe and heel stops 2 and 3, respectively, for measuring the length of the foot; and gauge forming side stops 4 and 5, respectively, for measuring the width of the foot.

As referred to in said application the heel and toe stops for measuring the length of the foot are operated by means of a screw 7 provided with right and left threaded portions 8 and 9, to which the heel and toe stops are connected whereby they are moved simultaneously an equal amount in reverse directions towards and away from one another, depending on the direction the screw is turned.

The heel and toe stops are moved by travelling nuts on the respective threaded portions 8 and 9 of the screw; 10 represents the nut which moves the toe stop and 10' the nut which moves the heel stop. Each of the nuts is widened to run in slits 11 cut within the bed 1, and connected to the nuts thus widened are slides 12, 12 which move in ways 13, 13 cut in the top face of the bed. The heel and toe stops are secured, respectively, to these slides by arms 15 which overlap the bed of the machine.

In similar manner the side stops 4 and 5 are moved towards and away from one another by means of a screw 16 provided with right and left threaded portions 17, 18 to which the side stops are connected whereby they are moved simultaneously an equal amount in reverse directions toward and away from one another, depending as the screw is turned in one direction or the other. The side stops are moved by travelling nuts on the respective threaded portions 17, 18 of the screw 16; 20 represents the nut which moves one side stop and 20' the nut which moves the other side stop. These nuts run in ways in the bed of the machine and are connected to the respective side stops in manner similar to that, before described, by which the nuts 10, 10' are secured to the heel and toe stops.

In the present case the toe stop, and each of the two side stops, are so equipped that an electric circuit will be completed when the stops are brought into such proper and precise engagement with a foot being measured as to obtain an accurate measurement, and this current is availed of to give an indication of such measurement.

As will be seen in said application the heel stop and each of the side stops of the respective gauges are in the nature of vertical flanges upstanding from the end of the arms 15 which extend over the face of the bed 1 and form a portion of the elements by which the stops are connected to the screws by which they are operated. In the present case the toe stop and each of the side stops is provided with a displaceable facing 22 which forms the immediate element for the stop with which the foot has contact. The facing consists of a relatively thin plate of hard rubber or other insulating material having, preferably, the same diametrical area as the stop to which it is adjacent. It parallels the stop and is movable translatably with relation to it. In order to obtain precision in this translatory movement the facing is provided on the back with a rectangular thickening or boss 23 which fits within a rectangular socket 24 formed in the stop. Attached to the bottom of this boss is a tongue 25 which fits slidably within a slot 26 cut in the arm 15 bearing the stop. Thus the toe stop and respective side stops are provided each with a movable facing slidable translatably with precision in relation to it.

30, 31 represent, respectively, wires to an electrical circuit. These wires connect, respectively, with contacts set in an insulating block 32, the wire 30 connecting with a contact 33, and the wire 31 with a contact 34. The insulating block 32 is fastened by screws 35 to a bar 36, and this bar is secured by screws 37 to the top face of the arm 15 bearing the stop. The contact 33 to which the wire 30 is secured extends outside the block within which it is bound and is a fixed contact. The contact 34 to which the wire 31 is secured also extends outside the block within which it is bound in parallel relation to the contact 33 normally spaced therefrom, thus providing a break in the circuit. The contact 34 is, however, a spring contact and when distorted is capable of being moved into engagement with the contact 33 for closing the circuit. The contact 34 is moved into engagement with the contact 33, by means of a post 40 projecting from the back of the boss 23 borne by the facing 22. The post is preferably threaded to fasten into the boss. It projects through an opening in the bar 36 but out of contact therewith. The post is provided with a head 41 and set centrally within this head is a pin 42 adapted to have contact with the spring contact 34. The arrangement of the parts is such that the normal bearing of the spring contact 34 against the pin 42 will through the post hold the facing away from the stop. Upon the application of pressure, as when the foot is being measured, the bearing of the foot against the facing will move it towards the stop and through the inter-connecting post and pin will move the spring contact 34 into engagement with the fixed contact 33 closing the circuit.

The nut 10 which actuates the toe stop and, for that matter, the nut 10' which actuates the heel stop during the travel thereof, as the screw 7 is turned on which these nuts are arranged, arrive during the measurement of a foot at different determinate adjusted positions which correspond with the different size length of shoes proper for the foot being measured from sizes 1 to 13 inclusive. Fixed to the nut 10 which actuates the toe stop by a stirrup 45 is a clamp 46 which carries a casing 47 within which is arranged a plunger 48 backed by a spring 49. The plunger extends at right angles to the line of travel of the nut 10. The plunger forms a part of the electric circuit, for connected to the rear end thereof, or to a rod 50 connected thereto, and extending back through the rear end of the casing within which the plunger is operating, is one of the circuit wires 30, 31. The casing within which the plunger is arranged and the clamp bearing the casing are either made of insulating material, or otherwise equipped to insulate the plunger so that an electric current will be localized to pass through it.

The plunger 48 is maintained to have sliding contact with the face of a block 52 in which is set a series of terminal contacts 53. These terminal contacts are insulated from one another and each has its own connection in the electric circuit. The terminal contacts 53 correspond in number with the length sizes of shoes for feet being measured for length and are located in the block in positions relatively corresponding with these variations in length sizes. As the plunger 48 is moved over the face of the block 52 it will engage some one of the terminal contacts 53 which corresponds with some specific size of shoe for foot being measured. The various terminal contacts 53 are in circuit connection with a series of electric bulbs 55. These bulbs are located within a box or casing 56 on the machine, each bulb having its own compartment within which it is contained. The box containing the bulbs has a cover 57 in which is set a glass or panel 58 common to all the bulbs so that any portion of the panel located above a compartment within which a bulb is contained will be illuminated on lighting the bulb. Located upon the panel of the cover is a series of numerical indications 4–14 inclusive which indicate the different length sizes of shoes including full sizes and half sizes. These indications have proper location on the panel with relation to the different compartments containing the bulbs so that when any one bulb is lighted which corresponds with a particular size of shoe, that size by numerical indication or number will be illuminated to appear on the panel to the one whose foot is being measured as he looks down upon the panel. The circuit will not be completed to give visual indication as thus described for size length of shoe proper for size length of foot being measured until the heel and toe stops have been brought into such proper and precise engagement with the foot being measured as to obtain an accurate measurement. This accuracy of measurement is brought about when the pressure of the toe against the facing 22 of the toe stop has moved this facing sufficiently to move the contact 34 into engagement with the contact 33 thus completing the circuit and thereby causing lighting of a bulb which corresponds with the proper size of shoe for the foot being measured, and upon the lighting of which bulb the numerical indication of length size will visually appear on the panel.

Each of the nuts 20 and 20' which move the side stops and control the position thereof as a foot is measured for width arrive at different determinate positions which correspond with the different size width of shoes proper for the foot being measured from sizes 3A to 3E, inclusive including half sizes. Fixed by a stirrup 60 to the nut 20 which actuates one of the side stops is a casing 61 within which is arranged a plunger 63 backed by a spring 64. The plunger extends at right angles to the line of travel of the nut 20. The plunger forms part of the electric circuit, for connected to the side thereof is one of the circuit wires 30, 31. The casing within which this plunger is arranged is either made of insulating material, or otherwise equipped to insulate the plunger so that an electric current will be localized to pass through it.

The plunger is maintained to have sliding contact with the face of a block 65 in which is set a series of terminal contacts 66 in staggered relation to one another. Within the block these terminal contacts are insulated from one another and each has its own circuit connection. The terminal contacts 66 correspond in number and relative location with the full width of size of shoes for feet being measured for width. They are localized in the block in position relatively corresponding with these variations in width sizes. Their relative position, however, will vary dependent upon the size of a foot being measured for length. In other words, the position of a terminal contact 66 which calls for an F width in a 7 shoe is different from the position of a terminal contact which calls for an F width in an 8 shoe. This however, is compensated for by mounting the block 65 in a casing 68 arranged to slide within ways 70 on the under side of the bed of the machine. Thus arranged the block 65 may be moved in a direction parallel with the screw which actuates the nut 20. The proper variation in the position of the block 65 for differences in size length is obtained by means of a cam 71 fixed to the nut 10' on the threaded portion 9 of the screw 7 which actuates and controls the position of the heel stop. The cam 71 has sliding engagement with a member 72 on the casing 68 containing the insulated block 65.

As the plunger is moved over the face of the block 65 it will engage some one or more of the terminal contacts 66, which correspond with some specific size of shoe for foot being measured. In this connection it will be observed that the terminal contacts 66, owing to their staggered position and relative closeness, permit of the plunger engaging either one single terminal contact 66 and another terminal contact adjacent and in staggered relation to it. When the plunger is engaging one single contact 66 the contact so engaged stands for a full width of shoe. When, however, the plunger is engaging two contacts 66 this stands for half width of shoe. For example, if the plunger is engaging the terminal contact corresponding with B width of shoe and also terminal contact corresponding with C width of shoe then this means that the foot is calling for a half size width between B and C.

The various terminal contacts 66 through wired connections 66' are in circuit connection with a series of electric bulbs 75. These bulbs are located in the same box or casing 56 on the machine in which are located the bulbs 55 previously referred to, each bulb having its own compartment, and are covered by the same panel 58 which is common to all the bulbs located in the box so that any portion of the panel located above the compartment within which a bulb is contained will be illuminated on lighting the bulb. Located upon the panel of the cover above the compartments which contain the bulbs 75 is a series of lettered indications 3A to 3E, inclusive, which correspond with the different width sizes of shoes. These indications have proper location on the panel with relation to the different compartments containing the bulbs 75 so that when any one of these bulbs is lighted which corresponds with a particular width size of shoe, then that indication of width will be illuminated to appear on the panel to the one whose foot is being measured as he looks down upon the panel. For full sizes in width one indication only will appear. For half sizes, however, two indications will appear, it being understood that the width is a half size between the two indications for full size. The circuit will not be completed to give visual indication as thus described for size width of shoes proper for any size length of foot being measured until the side stops have been brought into such proper and precise engagement with the foot being measured as to obtain an accurate measurement. This accuracy of measurement is brought about when the pressure of the foot against the side stops has moved the gauge facing 22 sufficiently to move the contact 34 into engagement with the contact 33 thus completing the circuit and thereby causing lighting of a bulb 75 or two bulbs for half sizes, which corresponds with the proper size width of the shoe for the foot being measured, and upon the lighting of which bulb or bulbs the letter indication of width size will visually appear upon the panel.

Besides its circuit closing function the spring contact 33 possesses the further capability of determining the proper amount of pressure brought to bear upon the foot during its measurement when the gauges are brought up to engage the foot. In other words, the complete tensioning of this spring contact 33, controlled as it is by a movable gauge facing against which the foot has immediate bearing, or the tensioning thereof in an amount sufficient to make electrical contact between it and the terminal 34, is determinative of the amount of pressure to be brought to bear upon the foot to obtain a proper measurement and of which indication is plainly given.

We claim:

1. In a foot measuring device a sign made visible by illumination through the closing of an electric circuit, mechanism for measuring a foot including parts movable to different adjusted positions dependent upon and corresponding with variations in foot size, a relatively displaceable member co-operating with said mechanism and against which the foot has immediate bearing during the measurement thereof and with relation to which said mechanism has change of position when adjusted for taking a foot measurement, and means whereby said member may close said circuit for illuminating said sign when said mechanism through adjustment has arrived at a precise and determinate position indicative of a foot size.

2. In a foot measuring device a sign having display characters indicative of shoe size and which characters are made severally visible by illumination through the closing of an electric circuit, mechanism for measuring a foot including parts movable to different adjusted positions dependent upon and corresponding with variations in foot size, a relatively displaceable member co-operating with said mechanism and against which the foot has immediate bearing during the measurement thereof and with relation to which said mechanism has change of position when adjusted for taking a foot measurement, and means whereby said member may close said circuit for illuminating said sign when said mechanism through adjustment has arrived at a precise and determinate position indicative of a foot size both for indicating through visual indication when the position of the measuring parts is final and proper for obtaining accurate measurement and for displaying a character indicative of such measurement.

3. In a foot measuring device a sign made visible by illumination through the closing of an electric circuit, mechanism for measuring a foot including parts movable to different adjusted positions dependent upon and corresponding with variations in foot size, a relatively displaceable member co-operating with said mechanism and against which the foot has immediate bearing during the measurement thereof and with relation to which said mechanism has change of position when adjusted for taking a foot measurement, a tension device controlling said member by which it may engage the foot with some degree of tension, and means whereby said member may close said circuit for illuminating said sign when said mechanism through adjustment has arrived at a precise and determinate position indicative of a foot size.

4. In a foot measuring device a sign having display characters indicative of shoe size and which characters are made severally visible by illumination through the closing of an electric circuit, mechanism for measuring a foot including parts movable to different adjusted positions dependent upon and corresponding with variations in foot size, a relatively displaceable member cooperating with said mechanism and against which the foot has immediate bearing during the measurement thereof and with relation to which said mechanism has change of position when adjusted for taking a foot measurement, a tension device controlling said member by which it may engage the foot with some degree of tension, and means whereby said member may close said circuit for illuminating said sign when said mechanism through adjustment has arrived at a precise and determinate position indicative of a foot size both for indicating through visual indication when the position of the measuring parts is final and proper for obtaining accurate measurement and for displaying a character indicative of such measurement.

JEREMIAH FITZPATRICK.
DONALD B. AMES.